United States Patent [19]

Laverty, Jr.

[11] Patent Number: 4,802,246

[45] Date of Patent: Feb. 7, 1989

[54] DISABLER AND ACTIVATION SYSTEM FOR PLUMBING FIXTURE

[75] Inventor: Martin J. Laverty, Jr., Earlyville, Va.

[73] Assignee: Coyne & Delany Co., Charlottesville, Va.

[21] Appl. No.: 18,495

[22] Filed: Feb. 25, 1987

Related U.S. Application Data

[63] Continuation of Ser. No. 781,944, Sep. 30, 1985, Pat. No. 4,709,427.

[51] Int. Cl.[4] ............ E03D 11/00

[52] U.S. Cl. ............ 4/427; 4/DIG. 3

[58] Field of Search ............ 4/427, 415, DIG. 15, 4/661, DIG. 3, 302; 137/392, 624.12, 412, 413, 430, 433, 398, 399, 396, 397

[56] References Cited

U.S. PATENT DOCUMENTS

| | | | |
|---|---|---|---|
| 1,815,384 | 7/1931 | Tracy | 4/427 |
| 1,956,086 | 4/1934 | Tracy | 4/427 |
| 3,117,761 | 1/1964 | Billeter | 251/57 |
| 3,695,288 | 10/1972 | Billeter et al. | 137/360 |
| 3,778,023 | 12/1973 | Billeter | 251/41 |
| 3,908,204 | 9/1975 | Hopkins | 4/DIG. 3 |
| 4,041,557 | 8/1977 | Ringler | 4/427 |
| 4,141,091 | 2/1979 | Pulvari | 4/DIG. 3 X |
| 4,203,173 | 5/1980 | Morris et al. | 4/427 |
| 4,309,781 | 1/1982 | Lissau | 4/DIG. 3 |
| 4,402,095 | 9/1983 | Pepper | 4/DIG. 3 X |
| 4,471,498 | 9/1984 | Robertshaw | 4/DIG. 3 X |
| 4,498,203 | 2/1985 | Barnum et al. | 4/427 |
| 4,552,331 | 12/1985 | Smart | 4/427 |
| 4,709,427 | 12/1987 | Laverty | 137/398 |

FOREIGN PATENT DOCUMENTS

| | | | |
|---|---|---|---|
| 4635 | 1/1977 | Japan | 4/DIG. 3 |

OTHER PUBLICATIONS

Lyons, Jerry L., P. E. Lyon's Valve Designer's Handbook, pp. 239–241, Van Nostrand Reingold Co., New York, 1982.

*Primary Examiner*—Donald Watkins

*Attorney, Agent, or Firm*—McAulay, Fields, Fisher, Goldstein & Nissen

[57] ABSTRACT

A flush valve operating arrangement in which a pair of tubes extends between a flush valve actuator assembly and a remotely controlled operated unit, and a third tube is under supply line pressure and connected between the flush valve and the remotely controlled operated unit, the remotely controlled operated unit being connectable with the supply line pressure from the third tube with the pair of tubes; the pair of tubes and a fixture being connected with the flush valve with a water level control for controlling the water level in the fixture effective to prevent actuation of the flush valve actuator assembly by the remotely located operated unit to thereby prevent overflow of the fixture and flooding of a surrounding area; and a remote control for control of the actuation of the flush valve to render the same selectively operable separate from the water level control.

19 Claims, 5 Drawing Sheets

DISABLER AND ACTIVATION SYSTEM FOR PLUMBING FIXTURE

BACKGROUND OF THE INVENTION

This application is a continuation of application Ser. No. 781,944 filed on Sept. 30, 1985, now U.S. Pat. N. 4,709,427.

This invention is concerned with controlled operation of a remotely located flush valve from a readily accessible operating mechanism.

More particularly, the present invention is concerned with supplying water or other liquid to areas in relationship to the quantity removed to avoid damage or flooding.

The invention is particularly useful in installations subject to misuse, vandalism as well as outright excess supplying of water, in particular, to plumbing installations.

More particularly, the invention is useful in penal institutions, where it is desired to provide the least amount of accessibility eiter directly or indirectly to operating controls for a fixture to which water is to be supplied, and specifically to a urinal or toilet bowl to which flush water is to be supplied.

The invention also finds applicability in those installations in which electrical power is intentionally or accidentally shut off and controlled electrical reactivation is desired or required.

In many plumbing installations, it is desirable that the flush valves for flushing water closets and urinals be concealed as well as out of reach of a user and yet be readily accessible for operation by a user, for example. In certain installations, such as in prisons for example or in other non-normal situations, the user may stuff the water closet and cause overflow and flooding of the surrounding area. In other installations, playful mischievousness may also result in a blockage of the discharge passage of the water closet. Whatever the cause, blockage of the discharge passage is an undesirable situation and overflow and flooding is to be avoided.

The invention also proposes the user of a readily accessible flush valve actuator not requiring user hand actuation. In some situations and locations, it is desirable that a water closet be flushed without having to depend on the user.

In certain installations where user hand control is eliminated, it is also desirable to have a concealed control of the flushing operation separate and apart from the user activation as well as cooperation with user activation.

The invention also proposes the provision of a piston actuator on the flush valve responsive to the supply line pressure and which has orifice means separate and apart from the piston which does not interfere with the piston or result in a skewing of the piston while providing for a pressure drop across the piston, thereby insuring the positive operation of the piston. The orifice means permits restoration of the piston after the pressure has been disconnected by the push button For a readily accessible flush valve not requiring a user's hand, it is within the scope of the present invention to provide an infrared detector system which will operate the flush valve without the necessity of using a push button.

There are instances on record where inmates in prisons have purposely and deliberately clogged plumbing fixtures and then continued to operate the mechanism for supplying water to cause flooding of the fixture and the surrounding environs.

DESCRIPTION OF THE PRIOR ART

U.S. Pat. No. 3,695,288 to Billeter et al describes an enabler system comprising a hydraulic actuated flush valve hydraulically actuated by a push button valve. The push button is connected to the inlet supply line and to a piston in the flush valve coupling, primarily to take care of roughing-in variations. However, this patent also discloses an orifice in the piston of the flush valve actuating unit to provide and, according to the statements made in this patent, to insure the positive operation by providing for a pressure drop across the piston. The opening in the piston is made smaller in diameter than an opening into the flush tube of the flush valve.

However, the opening in the piston tends to clog, due to unwanted particles of dirt in the water stream, as well as due to corrosive action which takes place on the piston. Moreover, since the opening in the piston is eccentrically disposed relative to the central axis thereof and its associated cylinder housing, the piston is eccentrically loaded and wears unevenly and can become loose and result in a stopping action with respect to the aforesaid cylinder. Clogging of the opening in the piston would tend to override appropriate push button operation and result in a less than efficient operation of the flush valve as well as possibly resulting in a breakdown of the entire non-pushbutton flush valve operation.

SUMMARY OF THE INVENTION

The present invention proposes to overcome the foregoing disadvantages and provide for a remotely controlled actuator and hydraulic mechanism together with a flush valve enabler and flush valve disabler system.

The flush valve disabler system is designed in conjunction with the hydraulic actuated flush valve. The disabler unit is designed to prevent the premeditated as well as the accidental act of a user flooding the plumbing fixture by clogging the trapway and repeatedly flushing the flush valve, causing the fixture to overflow. When this device is used, the first flooding or overloading of the fixture will activate the system and prevent further flooding or overloading. The system will then have to be reset manually to restore it to normal operation.

To provide for an enabler system or a hands-free operation of a urinal or a water closet, a sensor is then combined with the flush valve actuator for the operation thereof. The sensor is provided with a time delay mode to prevent operation in response to a passer-by. The sensor includes a hold mode so that distinction is made between a passer-by and a user. Once a user moves away or out of range from the sensor, a signal is sent to the flush valve for the operation thereof. With the user of the sensor, the heretofore known pushbutton operation is dispensed with, and operation of the flush valve is automatic unless some clogging of the valve occurs to prevent operation. Here also, since the sensor can be used in a public installation or a prison installation, it is desirable to use the disabler system in conjunction with the enabler system.

With the use of the sensor, such sensor can be controlled externally as well as remotely from the urinal or water closet. Also, it is possible to control whether or not a flushing operation will take place in response to a commencement or termination of a flushing operation.

The invention also provides for an improved flush valve piston actuator assembly which includes an inner sleeve in the flush valve piston actuator assembly to by-pass the water around the piston, rather than through the piston, and thereby prevent misalignment thereof after prolonged and continuous operation. Moreover, the use of the sleeve is particularly useful which the sensor is used and pushbutton operation is dispensed with, so that automatic operation will take place and not require another charging of the water to the flush valve because of mis-operation due to a misalignment of the piston. With the sensor, a defective operation results in a non-flush and, for hygenic purposes, this is to be avoided. The sleeve in effect cooperates with the sensor to assure a flushing operation each time the sensor activates the flush valve.

An object of the invention is to prevent the deliberate overflow of plumbing fixtures such as a urinal or a water closet in prisons and other public installations due to malicious operation of plumbing items by users.

Another object of the invention is to prevent flooding of an area surrounding a plumbing fixture as a result of the continuous supply of excess water thereto while the plumbing system is not operating to remove the water therefrom.

A further object of the invention is to provide a water by-pass to by-pass the piston in the flush valve actuator assembly to assure operation of the flush valve each time it is activated.

Yet another object of the invention is the provision of a sensor operated flush valve, free of hand operation, which will provide substantially constant and repetitious operation without any interrupted operation due to a misalignment of the piston.

A further object of the invention is to provide an arrangement in which a sensor operated flush valve or a human directly activated flush valve can be rendered inoperative from a remote location and again rendered operative from the remote location.

DESCRIPTION OF THE PREFERRED EMBODIMENTS

Figure 1:
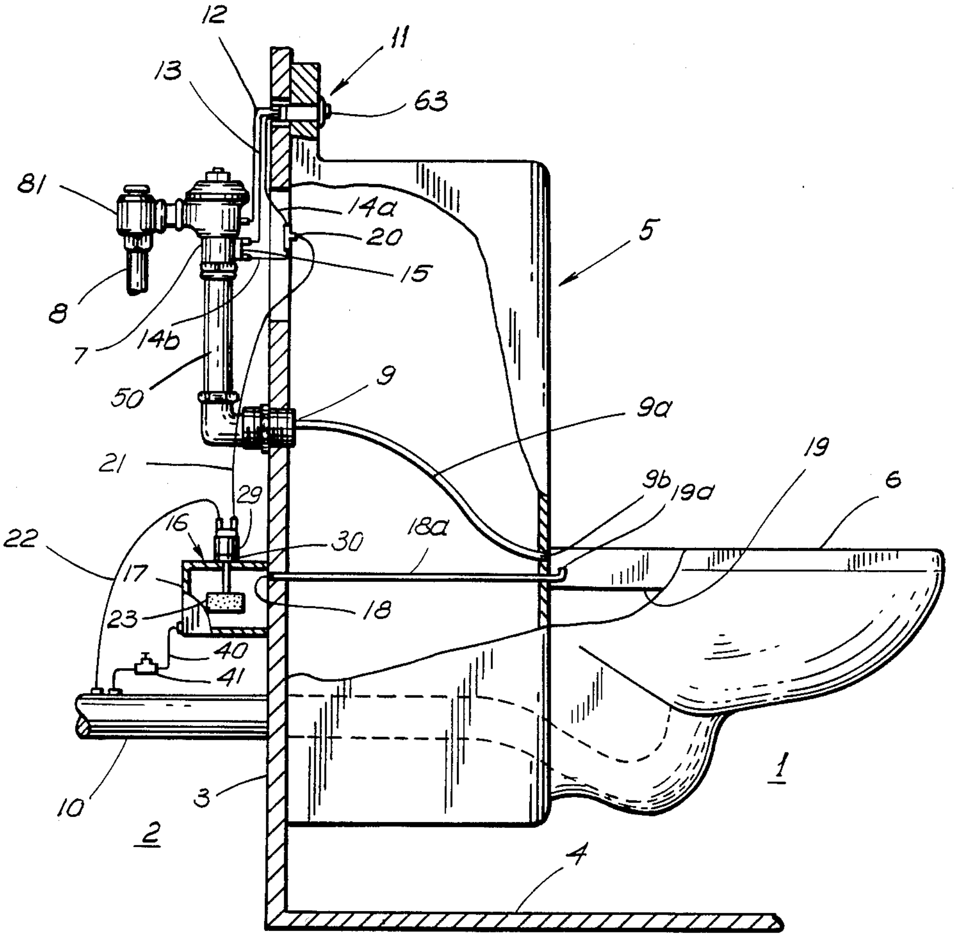
FIG. 1 is a schematic illustration of an installation with a flush valve disabler system provided with an exposed and readily accessible push button actuator, a concealed flush valve, a concealed sensor float valve fluidly connected with an exposed water closet partially broken away to show some of the internal arrangements, and a concealed float valve drainer.

Referring now more particularly to the drawings which illustrate the presently preferred mode for carrying out the invention, FIG. 1 illustrates a typical installation with an exposed area 1 and a concealed area 2 separated by a typical wall 3 and floor 4 with a wall hung water closet fixture 5 having a bowl portion 6. The installation also includes a commercially known flush valve such as a "Delany Hydro-Flush Valve" 7 with a conventional water inlet 8 and water outlet 9 through line **9*a* into water closet 5 and drain 10 schematically shown. An actuator 11 having a push button 63 is either positione on wall 3 or on fixture 5 (actuator on wall not shown on drawing) and has a water inlet line 12 from flush valve 7. Two water connection lines 13 and 14 (line 14 is composed of lines 14*a* and 14*b*) are connected from push button 63 of actuator or actuator valve 11 to fittings 13*x* and 14*x* on housing 72 (FIG. 4) of a flush valve actuator assembly 15 for actuating the flush valve in response to actuation of push button 63 to actuator 11**.

Push button 63 is one way to actuate actuator 11, and as will be disclosed and explained hereinafter in connection with FIGS. 10 and 11, actuator 11 may be actuated without the push button 63 being external to wall 3 and with actuator 11 taking the form of two-way solenoid valve 100 behind the wall and isolated from fixture 5.

To provide for means to prevent supply of water to fixture 5 when it can hold no more flush water and prevent bowl overflow, sensor 16 is provided behind wall 3 to prevent access thereto by any unauthorized persons. Sensor 16 includes a housing 17 which has an opening 18 connected with a pipe **18*a* in communication with wash down rim 19 of bowl 6 so that float 23 of sensor 16 will sense the height of the water level in the bowl. Opening 19*a* to pipe 18*a* is concealed within the rim 19 of bowl 6** or below to prevent access thereto and to prevent blockage.

While opening **19*a* is shown concealed within rim 19, it is also possible to place opening 19*a*** below the rim.

Figure 3:
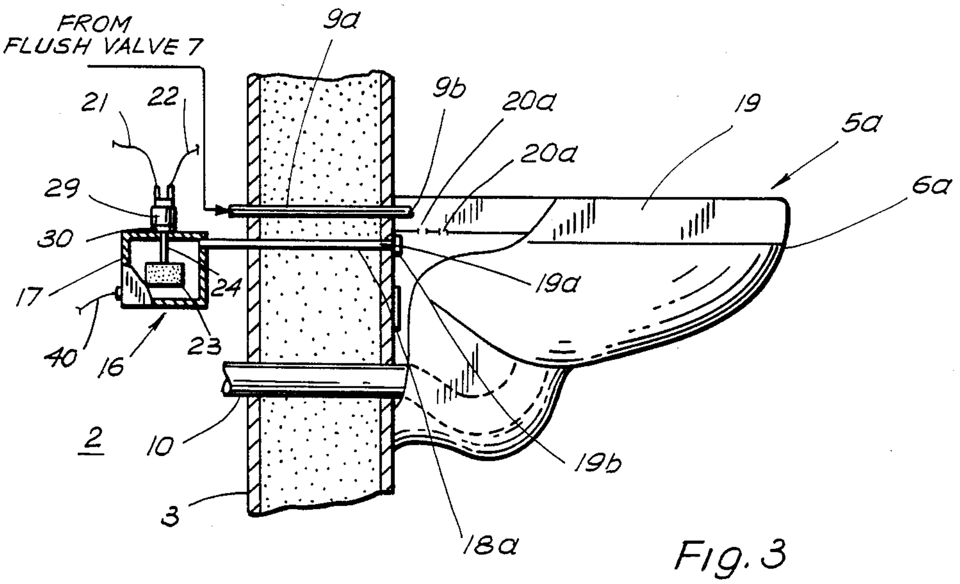
FIG. 3 is a partial schematic illustration of the installation of FIG. 1 showing the sensor float valve located proximate to the rim of a bowl and exposed.

A modification of the installation of FIG. 1 is shown in FIG. 3, with housing 17 located behind wall 3 in concealed area 2 and connected by means of pipe **18*a* to bowl 6*a* below wash down rim 19 of bowl 6*a* of water closet 5*a* with opening 19*a* of pipe 18*a* opening into bowl 6*a* so that the water level in the bowl will be measured by the water level entering into housing 17. In this embodiment, opening 19*a* is shown below wash down rim 19, but it can also be provided in a concealed manner in the wash down rim 19, then a housing 19*b* is used to conceal opening or inlet 19*a* to sensor 16. Rim 19 includes conventional openings 20*a* through which flush water is supplied as in FIG. 1 through line 19*a* to water outlet 9*b* from flush valve 7 concealed behind wall 3. Flush water passes through conventional openings 20*a* to flush bowl 6*a*, and when the water level is too high because there is a blockage in drain 10***a*, the water flow direction back flows and no longer passes through opening 20*a* but passes into opening 19*a* to pipe 18*a* and sensor 16.

The operation of the FIG. 1 embodiment of bowl 6 of fixture 5 is the same with water back flowing its flow and passing into opening 19*a* from the bowl 6 when the water level has reached the level of opening 19*a*.

Line 14 includes a T-connection 20 to provide for a water connection from push button 63 of actuator 11 to sensor 16 and is composed of lines 14*a* and 14*b* connected together through the T-connection 20 to flush valve actuating assembly 15 and connected with a bleed line 21 from T-connection 20 which forms an inlet line to sensor 16. Sensor 16 includes an outlet line 22 to the drain 10 located in concealed area 2 behind wall 3. As will be explained further, when sensor 16 is open to render lines 21 and 22 in fluid or hydraulic communication, push button 63 of actuator 11 no longer can cause or initiate operation of the flush valve actuator assembly 15.

Tubes 12, 13, 14*a*, 14*b* and 21 are isolated from the fixture 5 by wall 3 or the rear portion of fixture 5.

Figure 2:
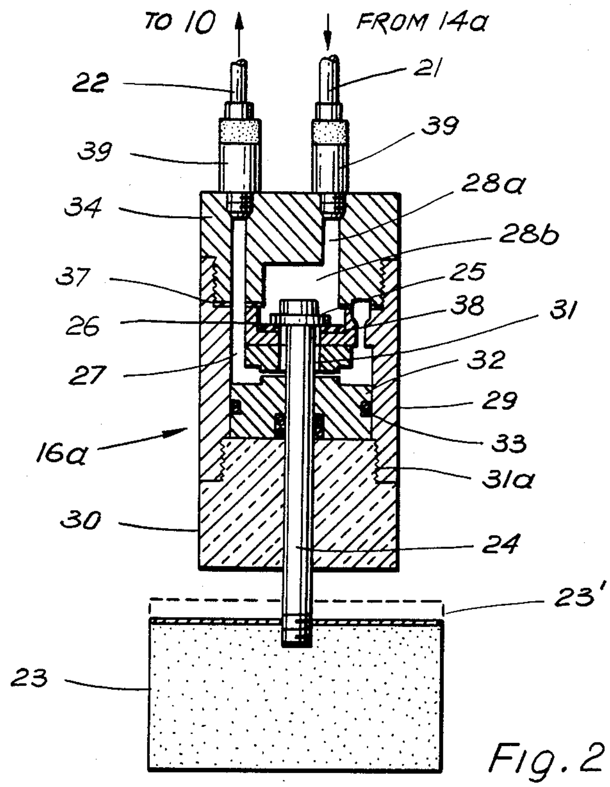
FIG. 2 is a sectional view of the sensor float valve used with the disabler system of FIG. 1.

Referring now more particularly to FIG. 2, sensor 16 is shown with housing 17 omitted for clarity and includes float 23 coupled with a sensor valve 16*a* having a pusher or piston rod 24 carrying a sealing piston 25 closing or seating onto seat 26. Inlet line 21 and outlet line 22 are isolated from each other when sealing piston 25 is seated onto seat 26. Line 21 receives water fed from line 14*a* through T-connection 20 then into line 21 and into a first chamber 28*b* in sensor valve 16a which is separated from second chamber 27 when piston 25 is seated onto seat 26, and when piston 25 is moved off from seat 26, it communicates with inlet line 21, and chamber 27 opens into outlet line 22 and feeds into drain 10.

Sensor valve 16*a* includes, outside housing 17, a body portion 29, a flange bushing 30 having a passage 31 therethrough to guide and control the direction of movement of piston rod 24. flange bushing 30 being threadedly connected with body portion 29 at threaded connection 31a below passage 31. Fitted within body portion 29 is piston guide rod 32 and provided with sealing O-ring 33. Received within the other end of body portion 29 is a passage separator 34 having an inlet portion or channel 28*a* which communicates with chamber 28*b* to form a first chamber. Washer 37 is provided to seal body portion 29 to passage separator 34. Seat 26 is also provided with washer 38 to provide a tight seal between sealing piston 25 and seat 26. Conventional fittings 39 are screwed into and received in passage separator 34 for connection of lines 21 and 22 thereto.

To provide for the removal of water from housing 17 and allow float 23 to reseat sealing piston 25 onto seat 26, a withdrawal line 40 (see FIG. 1) with a valve 41 is provided to exhaust the water in housing 17 into drain 10.

OPERATION OF DISABLER SYSTEM

The flush valve disabler system is operated by means of sensor 16 located behind wall 3 in concealed area 2 and includes pipe 18*a* for connection with rim 19 or the rim of bowl 6, as shown in FIG. 1 and in FIG. 3.

The sensor 16 is connected between the flush valve 7 and push button actuator valve 11. Sensor 16 can also be designated as a sensor float valve because it is composed of valve 16a and float 23.

Under normal operation, when the push button 63 of actuator valve 11 is operated, this opens a chamber in the actuator valve, as will be explained further in connection with the operation of the actuator valve 11, letting water pressure flow equally into two tubes or lines 13 and 14, one tube 13 going directly to piston actuator assembly 15 on the flush valve and the other tube 14 having a first tube or line portion 14*a* going to sensor float valve 16 hhrough T-connection 20 and tube 21 and to piston actuator assembly 15 through second tubing or line portion 14*b*. The sensor float valve 16 is normally closed; this lets the water pressure from the actuator valve 11 to flow equally in the two tubes 13 and 14 going to piston actuator flush valve assembly 15 on the flush valve after filling line 21 from T-connection 20 to sensor 16. The water pressure enters the piston actuator assembly equally pushing the piston (as explained subsequently) forward to trip the flush valve.

When float 23 of sensor 16 senses the water level and rises or moves inwardly to a position as shown in dotted outline 23' due to a blockage in the waste outlet or drain 10 or the fixture, it will open chamber 28*a* in the sensor float valve and place it into communication with chamber 27 through passageway 31 around piston or plunger rod 24 so that lines 21 and 22 are connected and water from line 14 flows through line 14*a*, T-connection 20 through line 21, through sensor 16*a* to line 22 into the drain. When the user operates the actuator valve 11, the water going to the two tubes 13 and 14 will not enter piston assembly 15 equally and apply pressure thereto from the two lines 13 and 14. This water pressure will be diverted to sensor valve 16*a* and therethrough and be dumped into the drain 10, letting no water pressure build up in piston actuator assembly 15 from line 14 (composed of lines 14*a* and 14*b*) to push the piston thereof and a relief stem or valve stem 70 (see FIG. 4) on the flush valve, this making the system inoperative to operate flush valve 7 and have flush water enter bowl 6.

The system can be reset from behind wall 3 by opening valve 41 and draining the water out of the sensor float valve storage chamber defined by housing 17 after blockage is removed from drain 10.

FLUSH VALVE PISTON ACTUATOR ASSEMBLY

Figure 4:
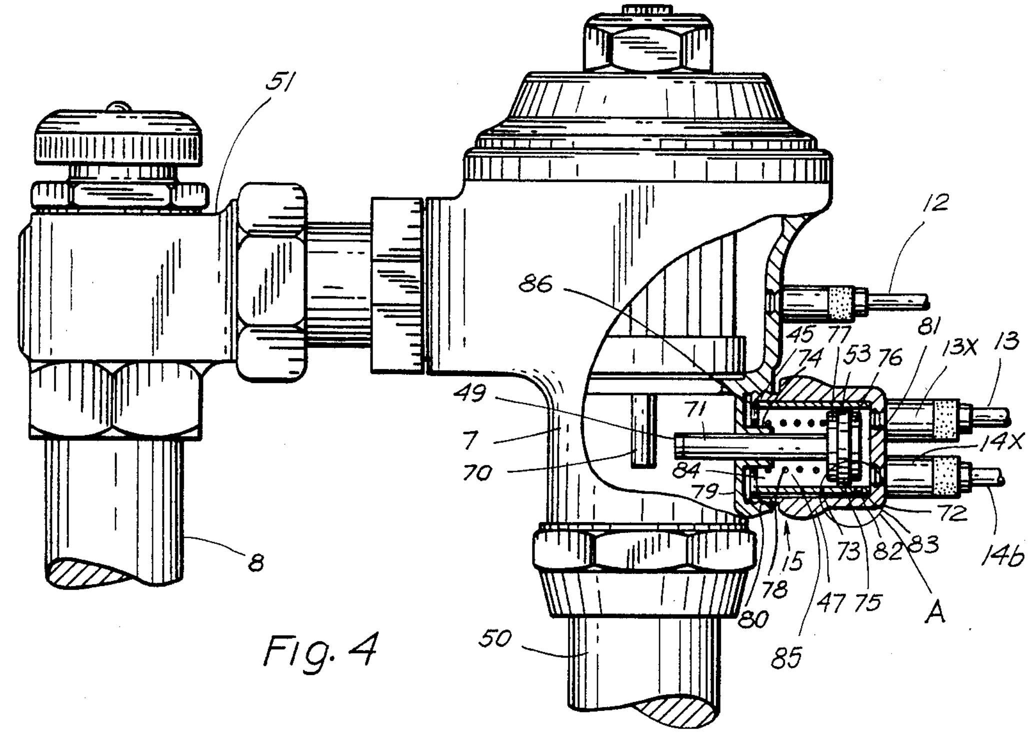
FIG. 4 is a partially perspective view and partially in section of a hydro-flush valve and a flush valve piston actuator assembly for use with and forming an operating part of the disabler system of FIG. 1.
Figure 5:
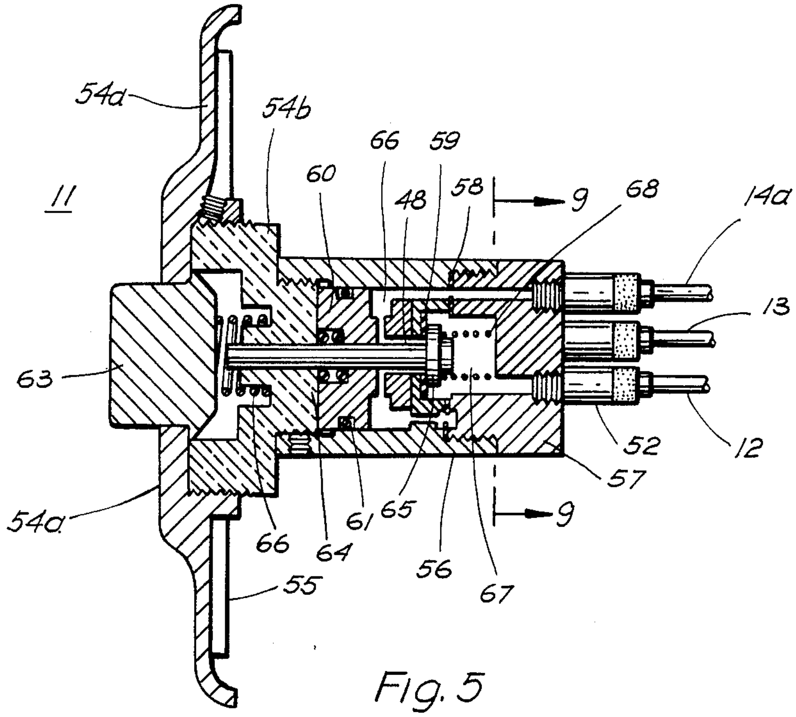
FIG. 5 is a sectional view of the push button actuator used in connection with the disabler system of FIG. 1.
Figure 6:
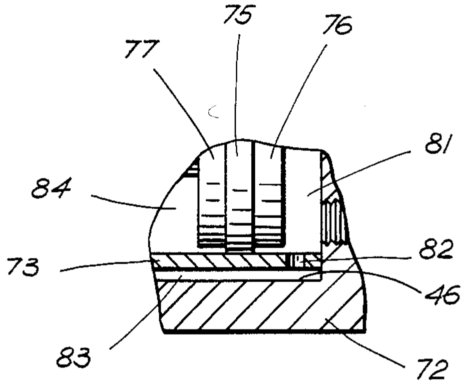
FIG. 6 is an enlarged detailed showing of the portion of FIG. 4 encircled in A.

Referring now to FIGS. 4 and 5, actuator 11 is connected and operatively associated with flush valve 7 through tubes 13 and 14, and like parts are designated with the same reference numerals as in FIGS. 1 to 3. It should be noted that push button actuator valve 11 is different from conventional push button actuation valves, although push button 63 is considered to be conventional, but actuation of flush valve 7 and its manner of actuation for repeatable operation is considered to be an important aspect and feature of the invention and improvement over prior art operating flush valves. Flush valve actuator assembly 15 is different from conventional flush valve actuators, as will become readily apparent from the following detailed description.

Flush valve 7 includes water inlet 8 and water outlet 50 which, when extended, connects with water outlet 9 into fixture 5 and stop control valve 51. Line 12 which is desirably formed of flexible plastic cabling or tubing for ease of installation is connected with water inlet 52 to actuator valve 11 Through water line or conduit 13 water is supllied under pressure to the face of piston 65.

Tubes 13, 14 and 21 may also be formed of flexible tubing and placed in the concealed area behind wall 3.

Flexible tube 12 is normally under constant hydraulic pressure from the water supply line 8 and the inlet side of the flush valve, while flexible tubes 13 and 14 (14*a* and 14*b*) as well as tube 21 are normally at zero line pressure.

The details of the push button actuator 11 and its manner of connection to a wall surface form no part of the invention, and the actuator includes a face plate 54*a* suitably held by a wall mounting member 54*b* to mounting wall 55 and includes aasing 56.

Actuator 11 has a valve portion associated with push button 63 and includes a passage separator 57, washer 58, seat washer 59, O-rings 60, 61, spring 62 to hold push button 63, disengaged from pusher rod 64 carrying piston 65. Chamber 66 is provided on one side of piston 65 and chamber 67 is provided on the other side thereof and together with seat washer 59 and washer 58 seals off water inlet line 12 from water outlet lines 13 and 14, when piston 65 is held seated on washer 59 by spring 68 and water pressure from tube 12 to isolate chambers 66 and 67 from each other.

When push button 63 is pushed to overcome the pressure of spring 62, push button 63 engages the end of pusher rod 64 and moves piston 65 away from or off washer 59 to render outlet chamber 66 in fluid communication with lines 13 and 14 and inlet chamber 67 is fed by water inlet line 12. Flush valve piston actuator assembly 15 (as will be explained) is only operable in response to water being supplied thereto through both lines 13 and 14 simultaneously and through line 14*b* directly to flush valve piston actuator assembly 15. The O-rings 60, 61 effectively seal off face plate 54*a* and wall mounting member 54*b* from outlet chamber 66 to prevent leakage.

Flush valve 7 includes valve stem 70, the end of which cooperates with push rod or plunger 71 and allows water to exit through water outlet pipe to, for example, toilet bowl 6*a*, or equivalent.

Flush valve piston actuator assembly 15 comprises a housing 72, an inner sleeve 73 and piston 53 carried by plunger 71 having nylon tip portion 49.

Piston 53 has a cup washer which includes a center washer 75 between two outer facing plates 76, 77 to create a better seal.

Axial movement of plunger 71 in housing 72 is controlled by washerless sleeve bearing 74 and sleeve 73 which guides piston 53. Piston 53 which comprises center washer member 75 provides a fluid-tight fit with the inner wall of sleeve 73. Piston 53 is spring-urged by spring 78 to maintain push rod or plunger 71 out of engagement with valve stem 70 unless pressure is applied to facing plate 76. Spring 78 is held between facing plate 77 and wall 79 carrying sleeve bearing 74; and housing 72 is screw-threadedly held by threads 80 to wall 79. Facing plate 76 has a diametrical extent which is foreshortened relative to washer member 75.

Figure 7:
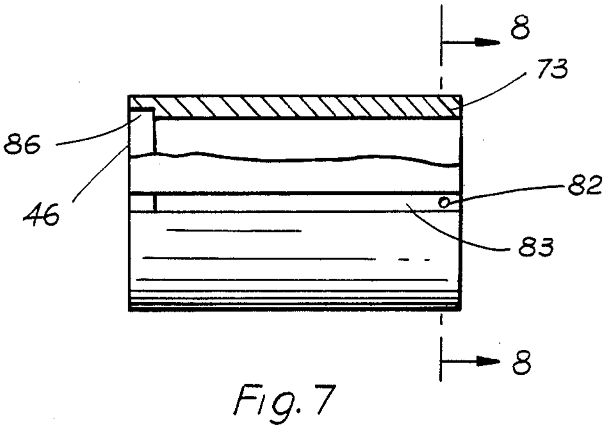
FIG. 7 is a detail showing the sleeve forming part of the flush valve piston actuator assembly shown in FIG. 4.
Figure 8:
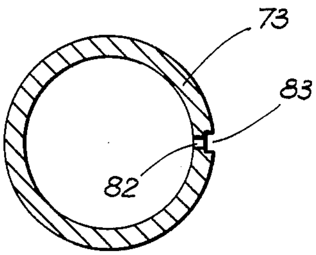
FIG. 8 is a sectional view taken on 8—8 of FIG. 7.
Figure 9:
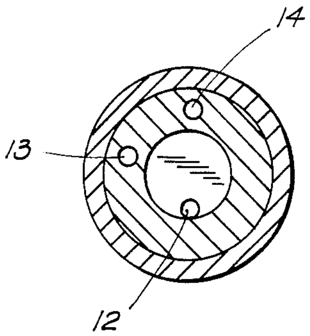
FIG. 9 is a sectional view taken on 9—9 of FIG. 5.

Sleeve 73 includes at one end thereof in fluid communication with inlet chamber 81 an aperture or opening 82 to permit fluid to by-pass piston 53. Sleeve 73 is also provided with a longitudinal channel 83 (see FIG. 7) which extends along the length of sleeve 73 and permits water from chamber 81 to enter chamber 84. Water from chamber 84 also passes into water outlet 50 through a space 85 between push rod 71 and washerless sleeve bearing 74. The space 85 between push rod 71 and sleeve bearing 74 is sufficient for water to move into outlet 50 on the other side of wall 79 to empty chamber 84 while providing a suitable bearing to guide the movement of push rod 71.

With the arrangement of inner sleeve 73, opening 82 and channel 83, the fluid pressure always remains uniformly distributed over the entire face of each face of piston 53. More particularly, each exposed face of facing plates 76 and 77 have no interruptions or discontinuities through which any fluid can pass so that the uniformity of the fluid pressure is changed and thereby causes a skewing of piston 53. A pressure drop is provided across piston 53, so as to render it inoperative The sleeve 73, opening 82 and channel 83 serves to relieve the pressure on the front side of piston 53 without skewing piston 53 thereby permitting its restoration, after the inlet pressure has been disconnected by the push button 63 or other novel actuating means as will be explained further hereinafter.

Moreover, it should be noted that with two inlets 13 and 14*b*, the piston 53 would not know whether improper pressure is supplied due to any discontinuity in the face of piston 53 or as a result of a discontinuity due to fluid pressure only being supplied by one of two inlets 13 and 14*b*.

The commercially known type flush valve such as a "Delany Hydro-Flush" valve 7 includes stop control valve 51 connected to the flush valve 7 and to the inlet water supply pipe 8. The outlet 50 of the flush valve 7 is connected to a lavatory, a urinal, a water closet, or any other types of basins. Water inlet line 12 is connected through a fitting to the water supply side of the flush valve body 7 and is "normally under water line pressure".

Water inlet line 12 is formed of tubing which is connected to the actuator valve 11 (FIG. 5) through inlet fitting 52. The piston assembly 15 has piston 53 contained inside to actuate the flush valve 7.

Lines 13 and 14*b* are connected through the piston 20 assembly 15. Lines 13 and 14*a* "normally under no water pressure" are connected to the actuator valve 11.

When a user pushes the actuator pushbutton 63, moving plunger 64 off its seat 59, inner chambers 48 and 66 in the actuator valve 11 permit water flow under pressure from the tubing 12 to be distributed equally into tubes or lines 13 and 14 and specifically into line 13 and line portion 14*b*.

The water when under pressure causes water to flow in lines 13 and 14 and enter the piston assembly 15, distributing pressure equally onto the piston 53. This pressure which is uniformly distributed over the face of facing plate 76 causes piston 53 to move inwardly to trip valve stem 70 of the flush valve 7. When the pushbutton 63 on the actuator valve 11 is released, the flow of water in tubing 13 and 14 is terminated. The remaining water behind the piston 53 is bled-off between the piston wall sleeve 73 and piston assembly sleeve bearing 74, letting the return spring 78 return the piston 53 back to its rest position. The flush valve 7 will go through its normal operation and shut itself off.

It should be noted that when the disabler is used in conjunction with the hydro-flush 7, there is a definite and required use for the second tube 14 from the push button valve 11 to the hydro-flush. Specifically, when outlet line 22 of the disabler is in its open position, the water in the second tube 14 is being diverted from line portion 14*a* through bleed inlet line 21 to outlet line 22 and prevented from going to piston 53 because of the pressure build-up. If water is applied through only one tube of the two equi-angularly spaced tubes 13 and 14, and the water is being diverted by the other tube 14 and specifically through line 21 because the sensor valve 16 is rendered operative, then the pressure on piston 53 is uneven and the piston is slightly skewed and the operation is improper and there is insufficient pressure to overcome the pressure of spring 78 and to operate the piston and move it. It should be noted that skewing will only take place in response to a cutoff of fluid from one of the inlet tubes, specifically inlet tube 14*b*, and not due to any deficiency or non-uniformity in piston 53.

The by-pass through aperture 82 and into longitudinal channel 83 around the piston reduces pressure on the piston 53. By diverting the water around piston 53 and not through it and running it through the channel, operation is improved because the pressure on the piston face remains substantially constant and is not non-uniform because of the opening or any by-pass through the piston.

The cross-sectional area of a plane perpendicular to the direction of water flow forming the opening for water flow in the aperture and the by-pass channel must be less than the combined cross-sectional areas of the flow of the water through the two tubes 13 and 14 (14*a* and 14*b*). Specifically, the cross-sectional area of the channel should be approximately one-quarter to one-half of the combined cross-sectional areas of the two tubes 13 and 14.

In the prior art, with an opening through the face of the piston, any dirt or desired foreign particles which is carried in the water is always directed at the piston hole or opening and generally with the same pressure and the same direction. On the other hand, by using the opening formed by aperture 82 on the sleeve 73 and the by-pass channel 83, the dirt is directed at different times at different places. While the dirt is dispersed, the dirt is not always directed with the same force and the same energy at the hole 82 in the sleeve. In addition, since the sleeve has channel 83, some of the dirt will go right through that channel onto the other side. The sleeve is preferably made from nylon, because nylon is not known to clog as much as glass or metal. However, since this is a functional material itself, and non-corrosive, the nylon also will not corrode. When the piston has to be or is made from metal, as in the prior art, it is believed that the reason that the orifice clogs is that the water is being moved in such a manner that it is constantly hitting the same spot with the dirt being directed at the same spot, so that there is a tremendous build-up.

The diameters of the tubes 12, 13 and 14 are preferably 5/32 of an inch and have complete flexibility for adjustment behind a very narrow wall, so that if they are bent they do not kink and prevent water flow through them. The cross-sectional area of the channel and hole varies between approximately one-quarter and one-half of the combined cross-sectional areas of tubes 13 and 14.

Where it is desired to have a finer control for the movement of the piston, three or more tubes equi-angularly spaced facing the piston and directing the water to the piston may desirably be used. However, it has been found that operation with two equi-angularly spaced tubes is quite satisfactory. On the other hand, a single tube which is off center has not been found to be very satisfactory and is not as good as the two tubes diametrically spaced from each other and such operation, at most, is marginal. Moreover, disabling with a single tube is possible, but the positive operation when no disabling is to take place desirably requires two tubes for skewing of piston 53 which prevents moving thereof.

The inner channel on the discharge side of the piston is undercut at 86. The reason for this is that when piston assembly nut 47 is tightened, the base 46 of the nylon or plastic sleeve liner becomes compressed and an area or a place for the material to move is required. The material seals up against the base of the housing going to the outlet so that the water does not leak out of the threads 80. The sleeve also serves the purpose of a sealing washer or at least the base portion 46 serves the purpose of a sealing washer.

Another advantage of the invention is the possibility to reduce the number of parts thereby eliminating the number of difficulties in connection with manufacturing. With the use of the sleeve, a number of the sealing rings and O-rings can be eliminated.

While discussion was had with respect to undesired foreign particles such as dirt, it should be noted that if extremely dirty water is used, even if sandy water is used, there will be less clogging in the by-pass channel 83 and aperture 82 thereto, as distinguished from clogging in an opening through the piston.

Moreover, the possibility of having the effective diametrical extent of the face of the piston changed as a result of a change in the size of the through-orifice through the axial direction of the piston is avoided.

AUTOMATIC OPERATION IN RESPONSE TO AN EXTERNAL SENSOR

Figure 11:
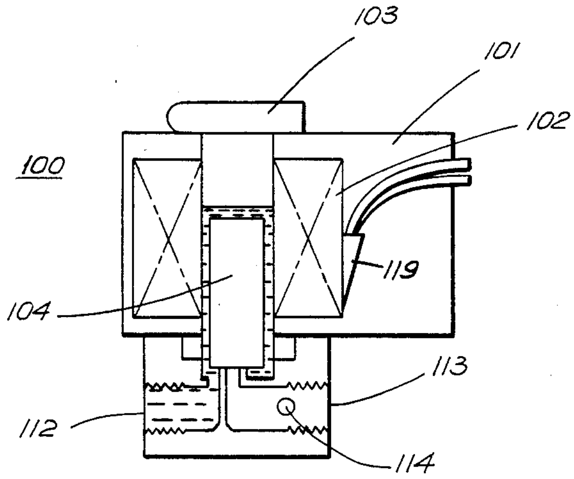
FIG. 11 is a schematic layout of the solenoid and valve and the mechanical parts in its de-energized condition.
Figure 10:
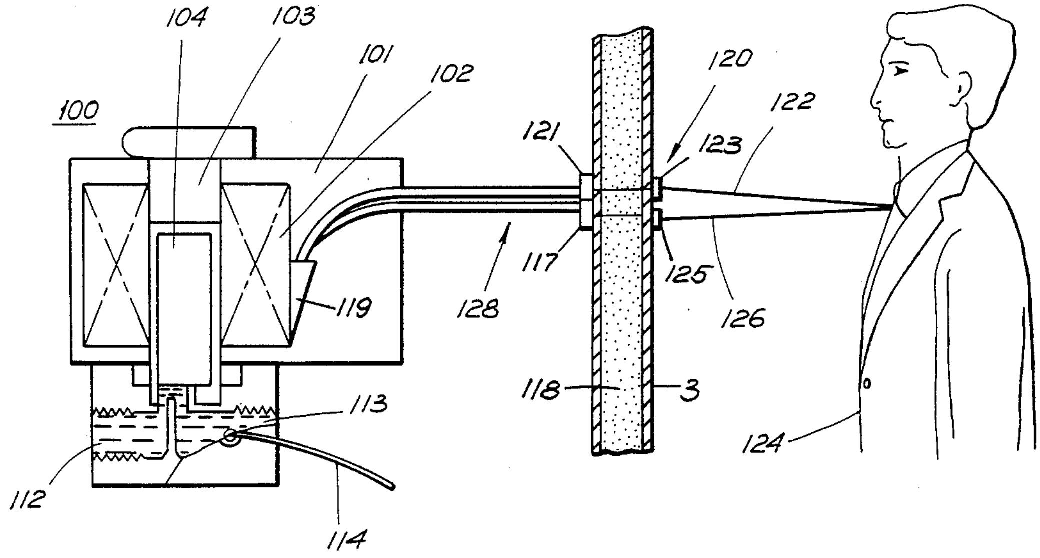
FIG. 10 is a modification of the actuator of FIG. 5 and is a solenoid operated sensor flush actuator employing an infra-red sensor to actuate a movable core to provide water flow from a valve body having a single inlet and two outlets; flow of water through a single orifice from the inlet to the position of the core when the solenoid is de-energized, or energized as shown.

Referring now to FIGS. 10 and 11, which show an infrared sensor apparatus which is usable in connection with flush valve 7 to render it operative to control the push button actuator valve 11 so that pushbutton 63 need no longer be exposed or used to operate the flush valve 7, which show a two-way solenoid valve 100 comprising a housing 101 containing a solenoid coil 102 surrounding a stationary core 103 with a spring actuated movable coil 104. An example of the type of solenoid valve found to be suitable is solenoid valve part No. 134 sv, manufactured by A.S.C.0. —Automatic Switch Company of Florham Park, N.J. The valve is provided with an inlet 112 and an outlet 113. For my purpose, I have added another outlet 114 and when the solenoid coil 102 is energized, moveable coil 104 is moved to place inlet 112 into fluid communication with outlets 113 and 114.

Solenoid valve 100 may suitably require push button 63 of actuator valve 11 and inlet 112 is connected with inlet line 12 and outlets 113 and 114 are respectively connected with fittings 13*x* and 14*x* on flush valve piston actuator assembly 15.

To activate the solenoid valve 100, an infra-red sensor 120 on wall 3 may suitably by used to transmit through a separate interior transmission conduit 121 an infra-red radiation ray 122 from the infra-red radiation ray transmitter, which exits through separate conduit 123, and when an individual 124 or other object is placed into the path of ray 122 at a pre-selected distance according to the distance desired, the individual or object 124 redirects ray 122 and returns an infra-red ray 126 towards the infra-red ray receiver and towards separate conduit 125 on one side of wall 3 and passes through a separate interior transmission conduit or infra-red receiving opening 127, which, in turn, is coupled by lines 128 to solenoid coil 102 to energize solenoid 100 for energization thereof and move movable core 104 so as to place water inlet 112 into fluid communication with water outlets 113 and 114. Lines 128 are also used to activate infra-red radiation transmitter for transmitting ray 122. Schematically shown at 119 is a switch mechanism which can be use to isolate infra-red sensor 120 from two-way solenoid valve 100.

Line 114 may also be connected to a T-connection 20 and be separated into lines 14*a* and 14*b* as in FIG. 1 with line 14*a* going to the T-connection 20 and line 14*b* going to fitting 14*x*.

Appropriate delays are used so that flushing will take place only when there is a sensed actual use so that short time activation of the solenoid 100 by infra-red sensor 120 will not activate the flushing mechanism. Desirably, the sensor is provided with at least a two seconds delay (although a longer delay may be provided), then the sensor activates the solenoid valve to start the water flow. The sensor stays on for two seconds and water flow stops when the cycle of the flush valve is completed.

Since infra-red sensor and solenoid valve 100 are electrically controlled through lines 128 and by isolating switch 119, operation of fixture 5 may be controlled from a remote source by controlling the electric power supply connected to solenoid 100 and infrared sensor 120 for rendering them ready to be activated, so that, if desired, the flush valve 7 for use with fixture 5 may be disabled or rendered inoperative by an external intervention of human selectivity, and rendered operative, if and when desired, by external human intervention. Of course, if for some reason failure should take place due to a power loss, then selective activation by turning on the power source to switch 119 and solenoid valve 100 can control when solenoid valve 100 is again to be placed into operation in a ready condition so as to render flush valve 7 operative in response to a pushbutton 63 or activation by infra-red sensor 120 to flush fixture 5. Specifically, complete control can be exercised by shutting off power to solenoid valve 100 or to the infrared receiver and transmitter of radiation 120 by means of switch 119 or remotely at the power mains, the controlled operated unit 11 can be rendered selectively operative and inoperative to control the flushing operation separate and apart from control of the flush valve actuator assembly 15.

In addition to switch 119, wall 3 can be provided with a suitable thickness and an appropriate isolating material 118 to prevent access to solenoid valve 100 from the outside and prevent the flow of unwanted flush water or fluid to water closet fixture 5 or a urinal or any other type of fixture to which water or fluid is supplied.

Solenoid valve 100 is particularly usable in connection with urinals. However, such valve is also usable in connection with drinking fountains, hospitals, where there is a desire to have automatic water control as well as in industrial establishments.

While there has been shown and described what is considered the present preferred mode of carrying out the invention, various changes and modifications may be made therein without departing from the scope of the invention.

What is claimed is:

1. In a liquid flush valve operating arrangement for a fixture to be flushed, including:

a flush valve operatively associated with said fixture;

a flush valve actuator assembly associated with said flush valve;

a remotely controlled operated electrically responsive unit remote from said flush valve actuator assembly and operatively associated therewith;

a pair of tubes extending between said flush valve actuator assembly and said remotely controlled operated unit;

a third tube under liquid supply line pressure connected between said flush valve and said remotely controlled operated unit, means in said remotely controlled operated unit for connecting the liquid supply line pressure from said third tube with said pair of tubes for actuating said actuator assembly;

an electrically opeaated infra-red sensor actuating device coupled with said remotely controlled operated unit for activation thereof in response to an object returning infra-red rays transmitted from said infra-red sensor actuating device to said sensor actuating device for connecting said remote operated unit with the inlet supply side of said flush valve;

said infra-red sensor actuating device comprising an infra-red radiation transmitter and an infra-red radiation receiver;

isolation means isolating said remotely controlled operating unit from said infra-red radiation transmitter and receiver;

said pair of tubes being normally at zero line pressure and being subjected to said liquid supply line pressure in response to said sensor actuating device being activated for rendering said flush valve actuator assembly operative to operate said flush valve;

means separate from said flush valve actuator assembly and associated therewith for bleeding off liquid supply line pressure to disable said remote operated unit; and means separate from said flush valve actuator assembly and said last-mentioned means and associated with said remotely controlled operated unit for disabling thereof to render said flush valve inoprative responsive to a change in electrical energy supplied to said sensor device or said remotely controlled electrically responsive unit.

2. In the arrangement of claim 1, including a by-pass associated with a drain outlet and separate from said flush valve actuator assembly for permitting excess liquid in said pair of tubes from said liquid supply line to discharge positively into the drain for reducing the line pressure in said third tube when said remotely controlled operated electrically responsive unit is restored; and wherein said means separate from said flush valve actuator assembly for bleeding off supply line pressure to disable said remote operated unit includes means response to liquid level in the fixture for prevention of actuation of the flush valve actuator assembly by said remotely controlled unit to prevent overflow of the fixture and flooding of the surrounding area.

3. In the arrangement of claim 1, wherein said remotely controlled operated electrically responsive unit includes:

a solenoid and a valve body having a single liquid inlet and a pair of liquid outlets;

said solenoid including an actuatable movable core; and said movable core being movable between a first position wherein said two liquid outlets and said liquid inlet are isolated from each other to a second position in which said two liquid outlets are in liquid communication with said liquid inlet.

4. In the arrangement of claim 3, wherein said infra-red sensor actuating device is electrically connected with said solenoid for energizing thereof in response to an individual rendering said infra-red sensor device operative to move said movable coil and place said outlets into communication with said inlet.

5. In the arrangement of claim 4, wherein said valve body includes:

a liquid passage between said liquid inlet and said liquid outlets; and said movable core seals off said liquid passage when said solenoid is de-energized.

6. In a toilet having a flush valve operating arrangement, including:

a toilet fixture for holding a flushing liquid;

a liquid flush valve operatively associated with said fixture;

a flush valve actuator assembly associated with said flush valve;

a remotely controlled operated unit;

a pair of tubes extending between said flush valve actuator assembly and said remotely controlled operated unit;

a third tube under liquid supply line pressure connected between said flush valve and said remotely controlled operated unit;

means in said remotely controlled operated unit for connecting the liquid supply line pressure from said third tube with said pair of tubes for actuating said actuator assembly;

liquid responsive means operatively coupled with said pair of tubes and with said fixture connected with said flush valve to be flushed responsive to liquid level in the fixture and including means for relieving liquid supply line pressure in said at least one of said pair of tubes when a predetermined liquid level is sensed for prevention of actuation of said flush valve actuator assembly by said remotely locate d operated unit to thereby prevent overflow of the fixture and flooding of a surrounding area; and remote control means associated with said flush-vvalve separate from said liquid responsive means for prevention of actuation of said flush valve coupled with said remotely controlled operated unit for rendering thereof selectively operative and selectively inoperative to cause said flush valve actuator assembly to be rendered operative and ready for response to said liquid responsive means operatively coupled with said air of tubes and to render said flush valve actuator assembly non-responsive to said remotely controlled operated unit.

7. In a flush mechanism operating arrangement for liquid flushing a fixture having flush means associated therewith, inlcuding:

a flush valve actuator assembly associated with said flush means;

a controlled operated unit, and a pair of tubes extending between said flush valve actuator assembly and said controlled operated unit;

means assocated with said pair of tubes and the fixture responsive to liquid level in the fixture and including means for relieving liquid supply line pressure in at least one of said pair of tubes when a predetermined liquid level is sensed for prevention of actuation of said flush valve actuator assembly by said controlled operated unit in relation to the quantity of flush liquid in the fixture to thereby prevent overflow thereof and flooding of a surrounding area; and control means coupled with said controlled operated unit for rendering said controlled operated unit selectively operative and inoperative separate from said liquid level responsive means.

8. In the flush arrangement of claim 7, wherien said flush valve actuator assembly includes:

a housing having two liquid inlets, one for each of said pair of tubes; and a sleeve assembly in said housing;

said sleeve assembly including:

a piston having opposed solid faces, and a sleeve associated with said housing and including by-pass means associated with said sleeve for by-passing liquid from one of the opposed solid faces of said piston to the other of the opposed solid faces;

said piston being slidable within said sleeve in response to the liquid supply line pressure being supplied to one of aaid solid faces of said piston by both said tubes of said pair of tubes simultaneously and with substantially equal hydraulic pressure in each said tubes for actuating said flush valve; and said by-pass means cooperating with said controlled operated unit to provide for communication between said pair of tubes and the outlet of said flush valve to said fixture to permit drainage of said pair of tubes and said housing into the fixture through said outlet of said flush valve, thereby providing uniform pressure over the face of said piston proximate to said pair of tubes.

9. In the arrangement of claim 8, wherein said sleeve is substantially cylindrical and has a longitudinal channel on the outer cylindrical surface thereof coaxial with and concentrically spaced from the central axis of said housing and a transverse opening from an inside portion of said sleeve opening into said channel, and said piston includes an outer plate having a foreshortened diametrical extent to provide access to said longitudinal channel from said transverse opening for all positions of said piston.

10. In the arrangement of claim 7, wherein said means associated with said pair of tubes includes:

a liquid level sensor device operatively associated with said fixture;

a piston-housing assembly including a liquid inlet and a liquid outlet associated with said housing, a plunger operatively associated with said liquid level sensor device either to isolate said liquid inlet from said liquid outlet or to place them into communication depending on the level of liquid in the fixture; and a bleed inlet line connected from one tube of said pair of tubes to said inlet, and an outlet line connected from said liquid level sensing device to a drain for diverting liquid in said one tube of said pair of tubes to said drain when said sensor device activates said plunger to place said liquid inlet and said liquid outlet into communication.

11. In the arrangement of claim 7, including:

a third tube under liquid supply line pressure connected between said flush means and said controlled operated unit, and means in said controlled operated unit for connecting the liquid supply line pressure from said third tube with said pair of tubes for actuating said actuator assembly; and said controlled operated unit includes an infra-red sensor responsive device for placing said third tube into communication with said pair of tubes.

12. In the arrangement of claim 11, wherein said infra-red sensor responsive device includes a time delay to provide for selective operation.

13. In the arrangement of claim 7, including:

an infra-red sensor actuating device coupled with said controlled operated unit for activation thereof in response to an object returning infra-red rays transmitted from said sensor actuating device to said sensor actuating device for connecting said remote operated unit with the inlet supply side of said flush mechanism; and said pair of tubes being normally at zero line pressure and being subjected to said supply line pressure in response to said sensor actuating device being activated for rendering said flush valve actuator assembly operative to operate said flush valve.

14. In the arrangement of claim 13, wherein said control means includes means coupled with at least one of said infra-red sensor actuating device and said controlled operated unit for rendering said flush means inoperative and for rendering said controlled operating unit and said infra-red sensor device operative to cause said flush means to be operated in response to a signal from said infra-red sensor device.

15. In the arrangement of claim 7, wherein said controlled operated unit includes:

a solenoid and a valve body having a single liqud inlet and a pair of liquid outlets; and said solenoid including an actuatable movable coil; and said movable coild being movable between a first position wherein said two liquid outlets and said liquid inlet are isolated from each other to a second position in which said two liquid outlets are in liquid communication with said liquid inlet.

16. In the arrangement of claim 15, wherein said controlled operated unit includes:

an infra-red sensor responsive device electrically connected with said solenoid for energizing thereof in response to an individual rendering said infra-red sensor device operative to move said movable coil and place said outlets into communication with said inlet.

17. In the arrangement of claim 11, wherein:

said valve body includes a liquid passage between said liquid inlet and said liquid outlets; and said movable coil seals off said liquid passage when said solenoid is de-energized; and said control means includes electrical means coupled with said controlled operated unit for rendering said controlled operated unit selectively operative and selectively inoperative.

18. In the arrangement of claim 16, wherein said control means includes electrical means coupled with said controlled operated unit for rendering said controlled operated unit selectively operative and selectively inoperative.

19. In the arrangement of claim 7, including means between the fixture and said tubes for isolating said tubes from said fixture but permitting connection to the fixture.

* * * * *